United States Patent
Saladi et al.

(10) Patent No.: US 10,893,106 B1
(45) Date of Patent: Jan. 12, 2021

(54) GLOBAL NAMESPACE IN A CLOUD-BASED DATA STORAGE SYSTEM

(71) Applicant: Druva, Sunnyvale, CA (US)

(72) Inventors: Naresh Saladi, Milpitas, CA (US); Abhijit Dinkar, San Jose, CA (US); Murali Bashyam, Fremont, CA (US)

(73) Assignee: DRUVA, Sunnyvale, CA (US)

( * ) Notice: Subject to any disclaimer, the term of this patent is extended or adjusted under 35 U.S.C. 154(b) by 0 days.

(21) Appl. No.: 16/568,086

(22) Filed: Sep. 11, 2019

Related U.S. Application Data

(60) Provisional application No. 62/729,561, filed on Sep. 11, 2018.

(51) Int. Cl.
| | | |
|---|---|---|
| H04L 12/00 | (2006.01) | |
| H04L 29/08 | (2006.01) | |
| H04L 12/66 | (2006.01) | |
| G06F 16/182 | (2019.01) | |
| G06F 16/13 | (2019.01) | |

(52) U.S. Cl.
CPC .......... *H04L 67/1097* (2013.01); *G06F 16/13* (2019.01); *G06F 16/183* (2019.01); *H04L 12/66* (2013.01)

(58) Field of Classification Search
CPC ........ H04W 12/06; H04L 12/66; H04L 63/10; H04L 45/02; H04L 45/745; H04L 67/1097; H04L 29/06068; H04L 45/74; G06F 3/0659; G06F 16/178; G06F 16/2272
USPC ........ 709/217, 203, 218, 219; 707/640, 690, 707/829
See application file for complete search history.

(56) References Cited

U.S. PATENT DOCUMENTS

| | | | | |
|---|---|---|---|---|
| 7,725,601 | B2* | 5/2010 | Conzola | H04L 67/1097 707/634 |
| 8,285,681 | B2* | 10/2012 | Prahlad | G06F 3/0649 707/640 |
| 8,447,780 | B1* | 5/2013 | Plantenberg | H04L 63/10 707/781 |
| 8,527,586 | B1* | 9/2013 | Becher | H04L 69/18 709/203 |
| 8,849,761 | B2* | 9/2014 | Prahlad | G06F 16/41 707/640 |
| 8,849,955 | B2* | 9/2014 | Prahlad | G06Q 50/188 709/219 |
| 9,171,008 | B2* | 10/2015 | Prahlad | G06F 16/122 |
| 9,489,515 | B2* | 11/2016 | Yermakov | G06F 21/56 |
| 9,503,371 | B2* | 11/2016 | Thakkar | H04L 45/745 |

(Continued)

OTHER PUBLICATIONS

Renny Shen, et al., "Integrating Object-Based Storage Using a Global Namespace," Reprinted from *Dell Power Solutions*, 2012 Issue 2., 4 pages.

(Continued)

*Primary Examiner* — Frantz Coby
(74) *Attorney, Agent, or Firm* — Kwan & Olynick LLP

(57) ABSTRACT

Techniques and mechanisms described herein provide for verifying data across cloud-based and on-premises data storage systems. According to various embodiments, data can be received by a gateway from a client machine and stored in a file data repository accessible via the internet. The stored data can have a common master namespace. Indications of updates to the master namespace can be received. Updated namespace data and metadata can be transmitted to the gateway.

14 Claims, 11 Drawing Sheets

(56) References Cited

U.S. PATENT DOCUMENTS

| | | | |
|---|---|---|---|
| 9,575,841 B2* | 2/2017 | Mason, Jr. | G06F 16/183 |
| 9,577,845 B2* | 2/2017 | Thakkar | H04L 12/66 |
| 9,590,901 B2* | 3/2017 | Tubaltsev | H04L 45/74 |
| 9,805,054 B2* | 10/2017 | Davis | G06F 16/1752 |
| 10,248,659 B2* | 4/2019 | Eda | G06F 3/0659 |
| 10,389,634 B2* | 8/2019 | Thakkar | H04L 12/66 |
| 2010/0332401 A1* | 12/2010 | Prahlad | H04L 63/0428 |
| | | | 705/80 |
| 2013/0028257 A1* | 1/2013 | Ludwick | H04L 61/106 |
| | | | 370/392 |
| 2013/0041872 A1* | 2/2013 | Aizman | G06F 16/182 |
| | | | 707/690 |
| 2013/0290470 A1* | 10/2013 | CaraDonna | H04L 67/1097 |
| | | | 709/214 |
| 2015/0227603 A1* | 8/2015 | Zalpuri | G06F 16/178 |
| | | | 707/614 |
| 2015/0242454 A1* | 8/2015 | Bakre | H04L 29/06068 |
| | | | 707/652 |
| 2015/0263899 A1* | 9/2015 | Tubaltsev | H04L 45/02 |
| | | | 370/254 |
| 2015/0324381 A1* | 11/2015 | Brand | G06F 21/6218 |
| | | | 707/829 |
| 2017/0315875 A1* | 11/2017 | Tirupati Nagaraj | |
| | | | G06F 16/2272 |
| 2019/0171621 A1* | 6/2019 | Eda | H04W 12/06 |

OTHER PUBLICATIONS

Cloud Bursting for High-Performance, Scalable NAS Challenge: Use the Cloud, Lose the Latency. (n. d.). [online] Available at: https://www.newnet.fr/wp-content/uploads/2017/08/Avere-Cloud-Bursting-Brief.pdf [Accessed Feb. 6, 2020].

Zhe Hu, et al., "Multi-Scale Video Frame-Synthesis Network with Transitive Consistency Loss," arXiv:1712.02874v2 [cs.CV] Mar. 19, 2018, 12 pages.

Liu, Z., Yeh, R., Tang, X., Liu, Y. and Agarwala, A. (n. d.). Video Frame Synthesis using Deep Voxel Flow. [online] Available at: https://arxiv.org/pdf/1702.02463 Aug. 5, 2017, 9 pages.

* cited by examiner

GLOBAL NAMESPACE IN A CLOUD-BASED DATA STORAGE SYSTEM

PRIORITY DATA

This patent document claims priority to U.S. Provisional Patent Application No. 62/729,561, titled "Global Namespace in a Cloud-Based Storage System," by Saladi et al., filed on Sep. 11, 2018, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present invention generally relates to data management across various public cloud storage providers, and more particularly relates to a method and a system for managing vast amounts of data across public cloud storage providers by implementing a global namespace system in a cloud-based storage system.

BACKGROUND

Because cloud storage is distributed, aggregate throughput is high, but individual object performance is low. There is a lack of standardized storage access and management functionality in the area of cloud storage. Consequently, developers usually customize their application to use proprietary application programming interfaces (APIs) provided by cloud storage vendors. Accordingly, improved techniques for interacting with cloud storage systems are desired.

BRIEF DESCRIPTIONS OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
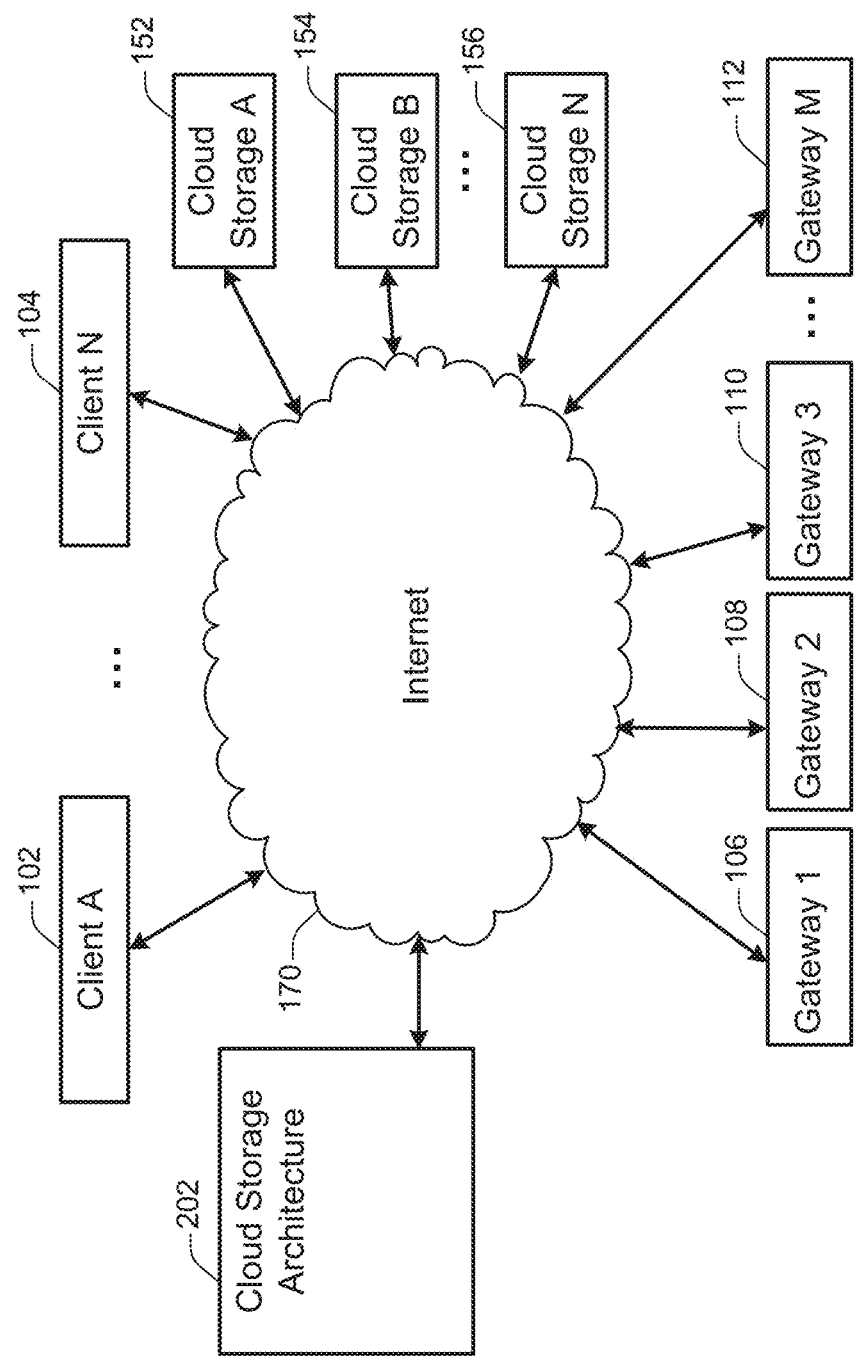
FIG. 1 illustrates an example of a system 100 for managing data across cloud-based and on-premises storage systems, configured in accordance with one or more embodiments.

Reference will now be made in detail to some specific examples of the invention including the best modes contemplated for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of specific configurations of client machines and cloud storage providers. However, it should be noted that the techniques of the present invention apply to a wide variety of such configurations. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Example Embodiments

Organizations with multiple locations often require multiple data centers in order to service local data storage, data backup, and data restoration needs without incurring high network latency and access costs. The use of multiple data centers may result in multiple copies of the same data and/or the sharing data across different sites. With more data being ingested and more users using storage services, there is a need to scale-up or scale-out the storage infrastructure.

One use case is that a file is initially created and written from one location. After some time, a user at another location wants to update the same file. For example, an audio or video file may be uploaded from one location, and ads may later be inserted from another location. In this use case, the file may lack a designated owner, and multiple locations may read from and/or write to the file. This use case may be referred to herein as a Master-Master access scenario.

Another use case is that the file ingestion process from a single host or gateway may be limited by disk and/or network speeds on the gateway. In order to achieve greater throughput, data can be ingested from multiple gateways within the same location and then stored on the same target volume. This use case may be referred to herein as a Master-Master scale-out backup/ingest scenario.

Yet another use case is that file ingestion happens from a single location, while other locations require read access but not write access to the file. This use case may be referred to herein as a Master-Slave scenario. Across all of these use cases, customers typically prefer a single unified view of their data from different locations without involving high latencies and costs.

Conventional approaches to addressing these use cases involve employing a cluster of nodes implementing a distributed file system in order to support scale-out needs. For example, one node may act as a metadata server and others as data nodes. The metadata server may include filesystem metadata, directory information, file metadata, location of data for files, and a deduplication dictionary. The metadata server may be replicated to provide redundancy and high availability. Data may be distributed across data nodes, and the same data may be available on multiple nodes for high availability and load balancing. The same approach may be extended to address multi-site environment by having multiple metadata servers and data nodes in different locations. However, as metadata servers and data nodes need to communicate over a WAN for synchronization, front-end or user operations on the cluster are often significantly delayed.

Another conventional approach is to have asynchronous replication between appliances at different locations. The replica node eventually receives the data from the source node based on the network bandwidth between these nodes. However, as data volume increases, multiple sources and replica nodes need to be maintained. Further, each location may require a replica node and that in turn puts load on the source node. Accordingly, improved techniques for providing data storage, data backup, and data restoration are desired.

According to various embodiments, techniques and mechanisms described herein provide for a storage solution that does not involve high appliance costs, high hardware costs, or high cluster maintenance costs. Instead, techniques and mechanisms described herein involve native replication and scale-out architecture provided by cloud computing environments.

In particular embodiments, a local cache in the gateway can quickly adapt to individual site needs due to temporal locality. Local cache speed and gateway configuration can also be tuned independently based on location needs. Since the cache is updated in a lazy fashion, the ingestion and/or backup procedure need not impose a synchronization cost. For example, each file in the local cache may get switched from one version to another atomically, for instance after writes from a different gateway.

In particular embodiments, the techniques and mechanisms described herein provide for updating the local cache when there is a change to namespace and/or file data/metadata through another gateway. Since data gets ingested and read from multiple gateways, the filesystem metadata is updated centrally using a service in the cloud.

According to various embodiments, files may be ingested from one or more locations via potentially many different gateways. However, these files may be stored in a common file repository and share a common namespace. Accordingly, global namespace information may be maintained and accessed as necessary to ensure a consistent namespace across the different gateways.

In particular embodiments, techniques and mechanisms described herein may facilitate scalable backup solutions to back up data to the cloud. For example, techniques and mechanisms described herein may facilitate backup solutions for organizations with multiple data center locations. As another example, techniques and mechanisms described herein may address one or more of the Master-Master access scenario, the Master-Master scale-out backup/ingest scenario, and the Master-Slave scenario.

Enterprise data backup/archive applications typically interface with storage devices using standard storage protocols such as Network File System (NFS), Common Internet File System (CIFS), Internet Small Computer Systems Interface (iSCSI) Tape, Fiber Channel Tape, and Network Data Management Protocol (NDMP). These interfaces are generally presented by high performance, low latency storage systems.

A storage administrator is also accustomed to a variety of storage management features such as centralized management of all storage assets, usage tracking, seamless data movement across storage tiers, snapshot and cloning of storage objects such as files, directories, volumes, and tapes.

Cloud storage, on the other hand, is high latency. Because cloud storage is distributed, aggregate throughput is high, but individual object performance is low. Further, cloud storage does not support standard storage protocols mentioned above. There is a lack of standardized storage access and management functionality in the area of cloud storage. Consequently, each user of cloud storage has to heavily customize their application to use proprietary application programming interfaces (APIs) provided by cloud storage vendor such as Amazon Web Service (AWS), Microsoft Azure, Google Cloud and several others. Accordingly, improved techniques for interacting with cloud storage systems are desired.

In many companies, client machines are configured to store information such as backup data to a network-attached storage system, with which the client machines communicate via a standard data storage protocol. Because cloud storage providers generally do not support such protocols, this has resulted in creating of a gap in what storage Enterprise backup/archive applications support and how cloud storage presents itself to end user and applications. Moreover, cloud storage management is lacking in terms of pan-cloud storage management functionality that a storage administrator is accustomed to.

Storage solutions increasingly involve storing files on internet-accessible cloud storage solutions instead of, or in addition to, locally accessible storage. Conventional approaches to cloud storage involve ingesting each file's data and metadata into a single object in cloud storage. However, such approaches end up limiting the ingest and restore rate of that file to the single object's write or read throughput of a server. For many servers, such a limit may be around 60 MB/s. By extension, this approach severely limits the overall IO throughput of the storage solution.

Conventional techniques have other problems as well. Data deduplication and other storage optimization techniques typically require relatively small chunks of data to provide efficiency. Accordingly, ingesting each file's data as a unit does not allow for many types of storage optimization. In addition, the storage of each file as a unit imposes high egress transaction and access cost when accessing a particular file's data. Further, the storage of each file as an unencrypted unit leaves data protected only by the security protections associated with the cloud storage provider's systems.

According to various embodiments described herein, the network-attached storage system may be replaced with a virtual machine configured to facilitate communication between a client machine and a cloud storage provider. From the perspective of the client machine, the virtual machine appears identical or nearly identical to the network-attached storage system. However, the virtual machine does not store the data locally but instead acts as an interface for storing the data on the appropriate cloud storage system.

According to various embodiments, techniques and mechanisms described herein virtualize cloud storage from multiple vendors and presents standards-based access and management interface to cloud storage. Further, techniques and mechanisms described herein may be used to simplify usage of cloud storage by Enterprise Information Technology (IT) applications without any change to the application itself.

According to various embodiments, techniques and mechanisms described herein provide for improved efficiency and speed and reduced costs when ingesting and accessing files in a cloud storage environment. Furthermore, techniques and mechanisms described herein provide for improved security against unauthorized data access. Accordingly, such techniques provide for substantially improved performance of storage solutions in which data is stored in the cloud.

According to various embodiments, techniques and mechanisms described herein may be used to provide improved performance for a variety of applications. Such applications may include, but are not limited to: storage target for backup applications, direct backup and restore of data, and long term archival of data in the cloud.

In some embodiments, a file may be broken up into multiple units referred to herein as segments. Segments may be of fixed or variable size. Each segment may then be uploaded to the cloud as a separate object. Multiple segments may be uploaded concurrently, effectively parallelizing the ingest operation by striping that file's data across several objects in the cloud. As the file is ingested, the segments that make up the file and the corresponding logical data offsets are tracked in a file-system metadata structure called the segment map.

In some implementations, each segment may be of a fixed or variable length. For instance, the length may be between 1 MB and 4 MB. According to various implementations, a smaller or larger segment length may be used. However, decreasing the segment length too much may be impractical due to the fixed cost associated with each storage transaction in a cloud computing environment. Similarly, increasing the segment length too much may reduce the effect of optimization techniques such as segment deduplication.

According to various embodiments, dispersing a file into multiple segments upon ingestion and then ingesting those segments in parallel addresses the twin problems of optimizing both cloud storage and network optimization. In addition, such an approach eliminates the single object access bottleneck that is present when each file is ingested as a unit.

According to various embodiments, each segment may be encrypted using an appropriate encryption algorithm. For example, envelope encryption based on an AES-256 standard may be used. By dispersing a file into multiple segments and separately encrypting each segment, the system may provide an additional level of indirection and security.

In some embodiments, during the upload process, all segments previously uploaded are tracked in a dictionary maintained on the system itself. Then, only the unique segments not present in the dictionary are considered for uploading, thereby achieving cloud storage and network optimization. That is, the system need not upload duplicate segments.

In some implementations, the segment map may be read ahead of incoming 10 when processing read requests. Then the addressed segments may be prefetched in parallel and stored in a segment cache. Multiple segments may then be downloaded in parallel, effectively parallelizing the restore or read operation. Such techniques may help to alleviate the problem exhibited by conventional techniques with respect to restricted read throughput. Such techniques may involve tracking multiple segments being downloaded and maintaining state for the already downloaded segments in a segment cache and the on-disk segment store.

According to various embodiments, techniques and mechanisms described herein may provide for reduced egress cost to access a file's data in part by caching the most recently uploaded segments in the segment cache. The segment cache may be maintained in memory as a standard least-recently used (LRU) based cache, with the evicted segments being stored on-disk in a segment store. Most recently read and uploaded segments may be stored in the segment cache, and eventually may be stored in the on-disk segment store. The segment store may be implemented as an on-disk, LRU based priority queue.

In some embodiments, the system is configured to detect unique segments and tracking multiple segments being uploaded concurrently by holding that state in parallel transactions. In addition, the system may track the completion of all the transactions in order to transition a file to a fully uploaded state.

According to various embodiments, as used herein the term segment may refer to a compressed, encrypted fragment of a file. A segment may be stored as a blob in Azure Storage, an S3 object in AWS, or any other suitable object in a cloud storage solution.

FIG. 1 shows a system 100 that embodies techniques and mechanisms described herein. The system includes clients A 102 through N 104 in communication with various computing devices via the internet 170.

According to various embodiments, each client may communicate with one or more cloud gateways such as the cloud gateways 106-112. Each cloud gateway may act as an interface to a cloud storage location. For example, a client may communicate with one or more gateways to store data to and/or retrieve data from one or more of the cloud storage locations 152-156. Additional details regarding the configuration and functionality of a gateway are discussed with respect to FIG. 2.

According to various embodiments, a gateway may be embodied in any of a variety of suitable computing devices. For example, a gateway may be implemented at least in part on a compute node in a cloud computing framework such as Amazon AWS or Microsoft Azure. As another example, a gateway may be implemented at least in part on computing hardware located on a client's local network. As yet another example, a gateway may be implemented at least in part on a computing device owned by a service provider such as the owner of the gateway.

In some implementations, gateways may be geographically clustered. For example, a client may communicate with a group of gateways located within the same geographically proximate data center. In such a configuration, the gateways may be tightly coupled and may coordinate storage operations with one another.

In some implementations, gateways may be geographically dispersed. For example, a client may communicate with a group of gateways located in different geographic locations. In such a configuration, the gateways may be loosely coupled and may act relatively independently from one another.

The cloud storage components shown in FIG. 1 may be managed at least in part by the cloud storage architecture 202. Additional details regarding the cloud storage architecture are discussed with respect to FIG. 3.

Figure 2:
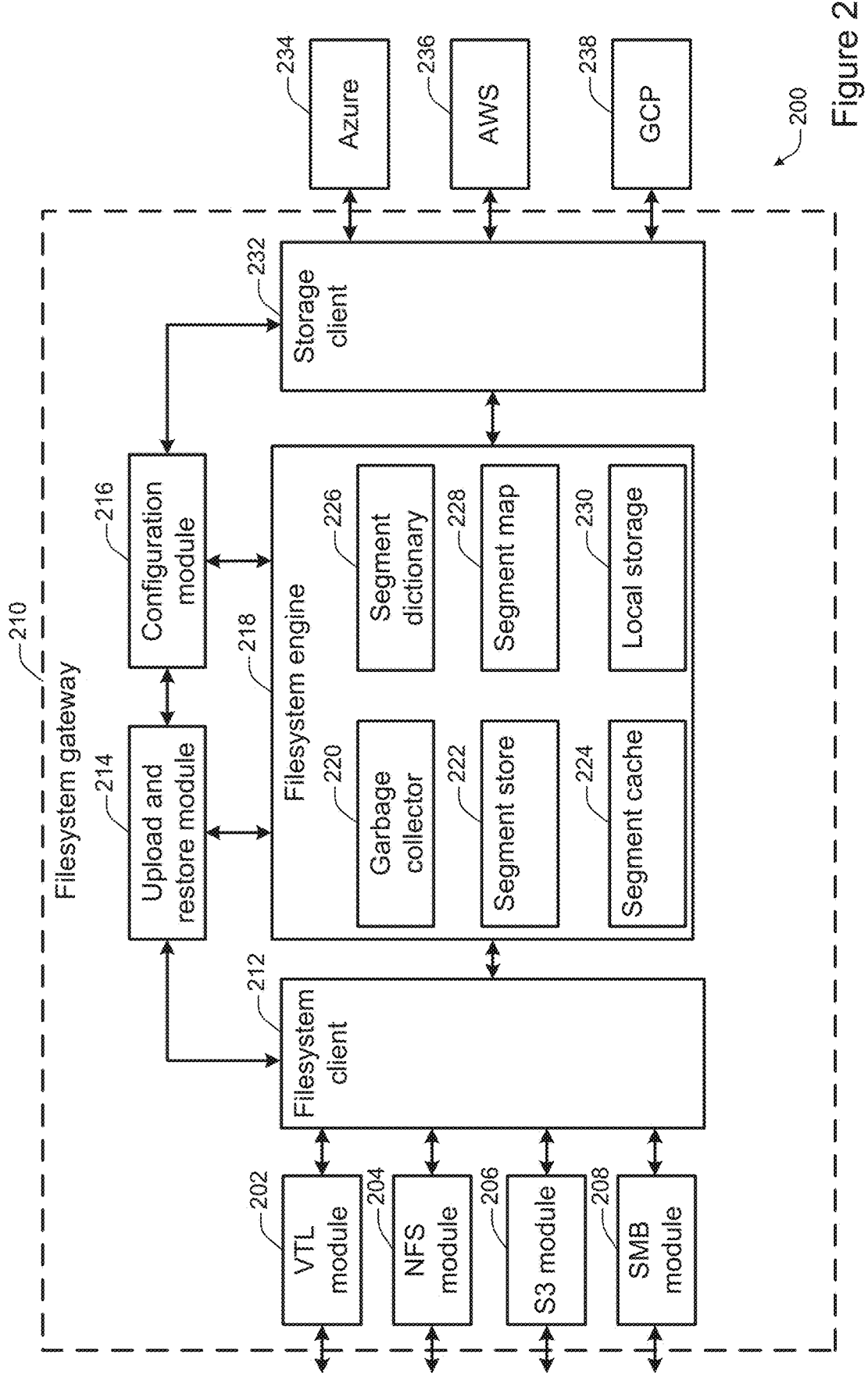
FIG. 2 illustrates an example of a filesystem gateway 210, configured in accordance with one or more embodiments.

FIG. 2 illustrates an example of a system 200 that embodies techniques and mechanisms described herein. The system 200 includes a filesystem gateway 210 that provides an interface between client machines and one or more cloud storage providers.

The filesystem gateway 210 includes a filesystem engine 218, which performs various operations related to ingesting and accessing files. According to various embodiments, the filesystem engine 218 may be implemented as a compute node, for example within a cloud computing system. Alternately, or additionally, portions of the filesystem engine 218 may be implemented in a different location, such as on a computing device associated with a client machine.

The filesystem client 212 may provide a POSIX-like interface to the filesystem engine. The filesystem client 212 may include one or more modules for facilitating access to the client via various protocols. A VTL module 202 may provide support for iSCSI VTL based backups and restores. An NFS module 204 may provide support for NFS export-based file IO. An S3 module 206 may provide an S3 interface for object-based access. An SMB module 208 may provide support for SMB share-based file IO.

At 214, an upload and restore module is shown. According to various embodiments, the upload and restore module may manage the upload of files when they are ready and archives them once they upload successfully. The upload and restore module may also perform the restore and periodic verification of those files upon request.

At 216, a configuration module is shown. According to various embodiments, the configuration module may interface with the cloud-based configuration and management service to perform operations such as obtaining configuration information, performing health monitoring, and providing stats and reporting information.

At 220, a garbage collector is shown. In some embodiments, the garbage collector 220 tracks the segment maps of files that have been removed from the namespace. The garbage collector 220 processes these segment maps in a transactional manner and deletes the segments no longer required since there are no files referencing them anymore. The garbage collector also ensures that no orphaned segments are left behind.

At 222, a segment store is shown. According to various embodiments, the segment store may track and maintains an on-disk index of segment related data and metadata. Such metadata may include, but is not limited to: segment compressed length, segment encrypted length, and segment reference count (i.e. refcount).

At 224, a segment cache is shown. In some implementations, segment cache may maintain an in-memory cache of recently accessed segments. Such recently accessed segments may be maintained in compressed or uncompressed form.

At 226, a segment dictionary is shown. According to various embodiments, the segment dictionary may be implemented as an on-disk data structure. The segment dictionary may store the segment hashes and the segment ID's they map to. This structure may facilitate storage deduplication in the cloud and may assist in improving upload efficiency.

At 228, a segment map repository is shown. According to various embodiments, the segment map may record the segments into which a file breaks up. A segment map may be stored in the cloud, for example in Page blobs. Alternately, or additionally, a segment map may be stored on-premise, for example in B-tree format.

At 230, a local storage module is shown. In some implementations, the local storage module may provide local storage for any of the information stored at the filesystem engine 218.

At 232, a storage client is shown. According to various embodiments, the storage client may support various cloud storage back-ends and provide a transparent interface to abstract away the differences between the internal cloud storage service APIs. Such cloud storage service APIs may include APIs for Microsoft Azure 234, Amazon AWS 236, Google Cloud Platform 238, and/or any other suitable cloud service provider.

Figure 3:
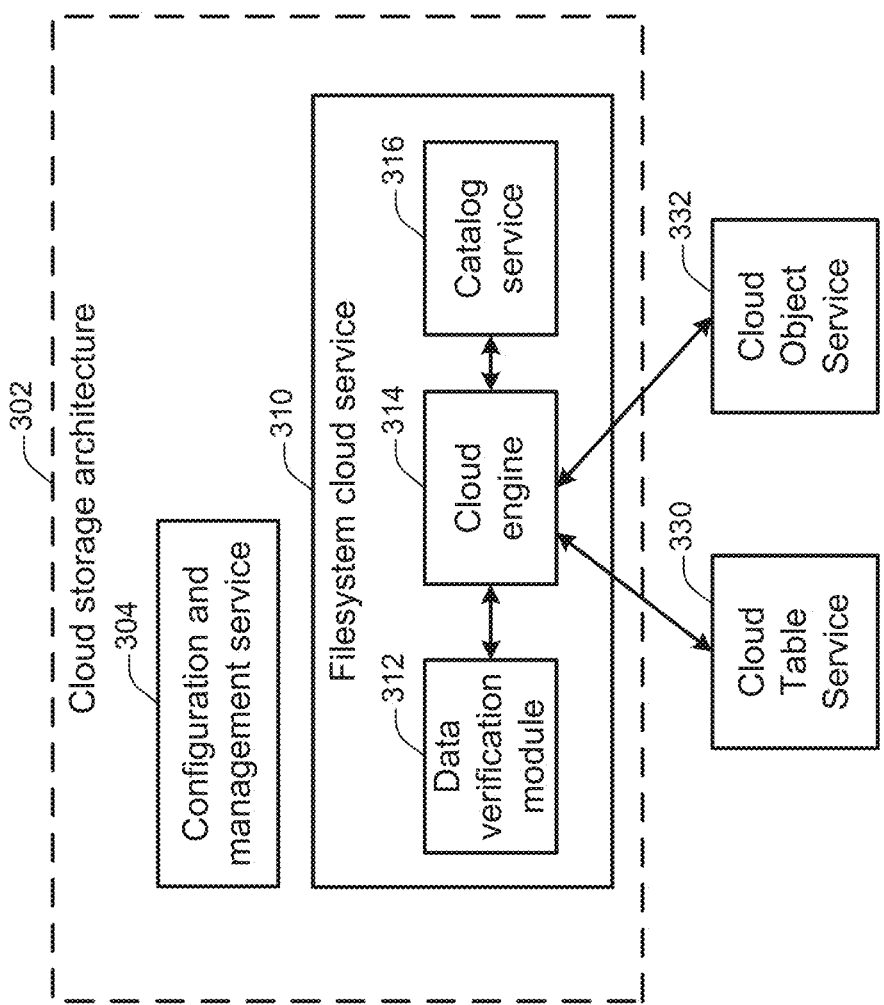
FIG. 3 illustrates an example of cloud storage architecture 302, configured in accordance with one or more embodiments.

FIG. 3 illustrates an example of a system 300 that embodies techniques and mechanisms described herein. The system 300 a cloud storage architecture 302 that includes various components implemented in the cloud and accessible to various cloud gateways.

At 304, a configuration and management service is shown. In some implementations, the configuration and management service 304 may run in any suitable cloud, such as the Microsoft Azure cloud. The configuration and management service 304 may provide configuration management, storage reporting functionality, and other such operations.

At 310, the filesystem cloud service is shown. According to various embodiments, the filesystem cloud service runs in the cloud and may provide cloud-based functionality such as data readability drills, a backup catalogue of all the files successfully backed up, and other such operations. The filesystem cloud service 310 may communicate over the filesystem protocol with the filesystem engine 118.

At 316, a catalog service is shown. According to various embodiments, the catalog service 316 may store any suitable information for the effective operation of the filesystem cloud service. For example, the catalog service may store a backup catalogue of the files successfully backed up.

At 312, a data verification module is shown. In some implementations, the data verification module is configured to perform any suitable data verification tasks. For example, the data verification module may periodically or upon request read data stored in the cloud and verify that the data remains accurate. Such a verification may involve, for instance, computing a hash of a data segment and comparing the hash to one previously generated and stored.

At 314, a cloud engine is shown. According to various embodiments, the cloud engine may act as a cloud-optimized module that is the counterpart of the on-premise filesystem engine. The cloud engine may provide the interface to the cloud filesystem stored data in the relevant cloud service (e.g., AWS S3/Glacier, Azure Blob/Archive, etc.) and the metadata in the cloud table service 330.

At 330, a cloud table service is shown, while at 332, a cloud object service is shown. According to various embodiments, the cloud table service 330 and the cloud object service 332 may be configured to store information in a tabular format and a blob format respectively. These services may be used to store the data maintained and employed by the filesystem cloud service 310. The services may be provided by any suitable cloud storage provider, such as Microsoft Azure.

Figure 4:
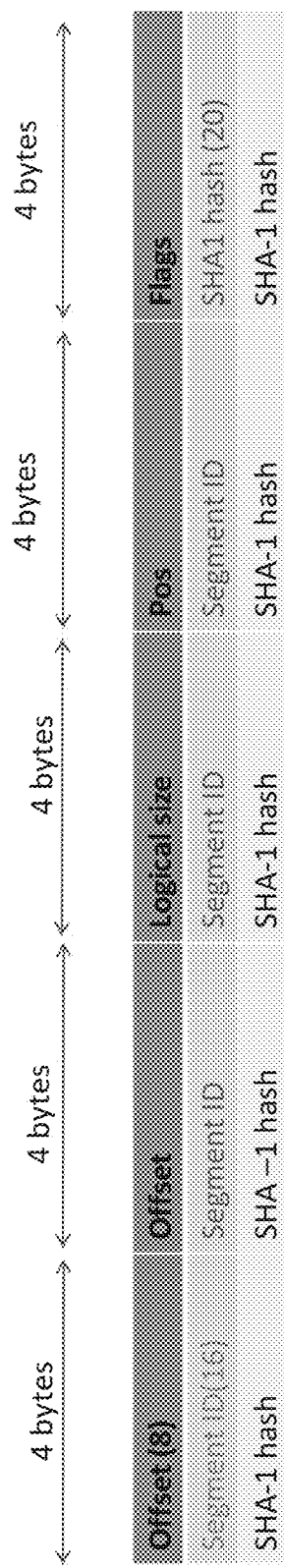
FIG. 4 shows an example of a segment map entry, configured in accordance with one or more embodiments.

FIG. 4 shows a representation of a segment map entry format. According to various embodiments, the segment map entry shown in FIG. 3 represents the mapping between a logical offset range of a file to the segment that stores the data for that range.

Figure 5:
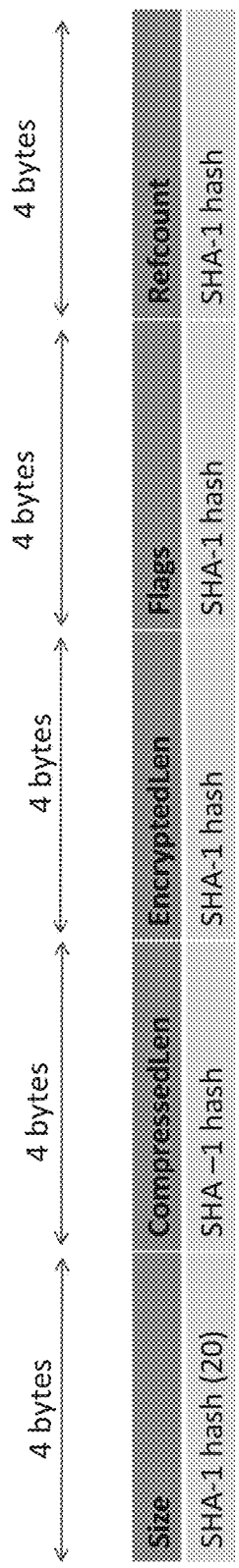
FIG. 5 shows an example of a segment store entry, configured in accordance with one or more embodiments.

FIG. 5 shows a representation of a segment store entry format. According to various embodiments, the segment store entry shown in FIG. 4 represents the header that is present before the actual segment data.

Features such as the byte sizes and the encryption formats shown in FIGS. 4 and 5 are included for illustrative purposes only. According to various embodiments, segment entry portion sizes other than 4 bytes may be used. Alternately, or additionally, hashing functions other than SHA-1 may be used.

Figure 6:
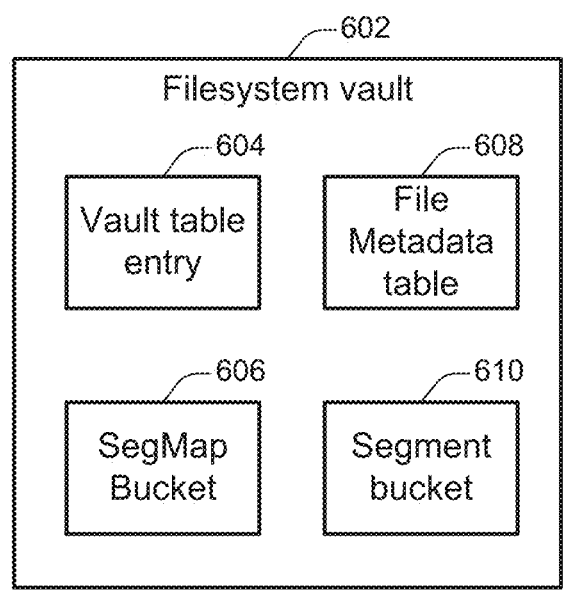
FIG. 6 shows an example of a filesystem vault 602, configured in accordance with one or more embodiments.

FIG. 6 shows a representation of a filesystem vault 602. According to various embodiments, a filesystem vault is a logical entity that has components in various locations. The filesystem vault 602 includes a vault table entry 604, a file metadata table 608, a SegMap bucket 606, and a segment bucket 610.

In some embodiments, a vault may be accessible to a client machine via any of a variety of suitable communications protocols. In this way, the filesystem client may serve as an API to allow the client machine to treat the cloud storage location as if it were a specific type of local or remote storage, regardless of how the files are actually stored. For example, from the perspective of the client, a filesystem vault may be treated as an NFS export, SMB share, VTL tape library, S3 bucket, or any other storage location accessible via a suitable storage protocol. A filesystem vault may be accessed concurrently by one or more physical or virtual clients.

In some embodiments, the segment bucket 610 is the location at which individual segments are stored, for instance as blobs. A segment bucket may be implemented using any suitable cloud storage location. For example, a filesystem vault may be implemented as an S3 bucket or Google Storage bucket.

According to various embodiments, the SegMap bucket 606 is the location at which segment maps are stored. The segment maps may map individual segments to files. For example, the segment maps may indicate which segments are included in a file and identify the order in which the segments are arranged to create the file.

According to various embodiments, the file metadata table 608 stores attributes of the files stored in the filesystem vault 602. For example, the file metadata table 608 may be a table included in the cloud table service 330. The file metadata table may store information that may include, but is not limited to: logical size, Mtime, file path relative to the device, statbuf info, SegMap ID, and extended attributes. The SegMap ID may identify the page blob that holds the SegMap entries, for example in the format shown in FIG. 4.

In some embodiments, the vault table entry 604 is an entry in a vault table included in the cloud table service 330. Each vault table 604 includes configuration information associated with a specific vault. For example, a vault table entry may identify the name and/or location of the SegMap bucket 606, the segment bucket 610, and the file metadata bucket 608. As another example, a vault table entry may identify configuration information that may include, but is not limited to: a compression policy, a deduplication policy, and an encryption policy.

Figure 7:
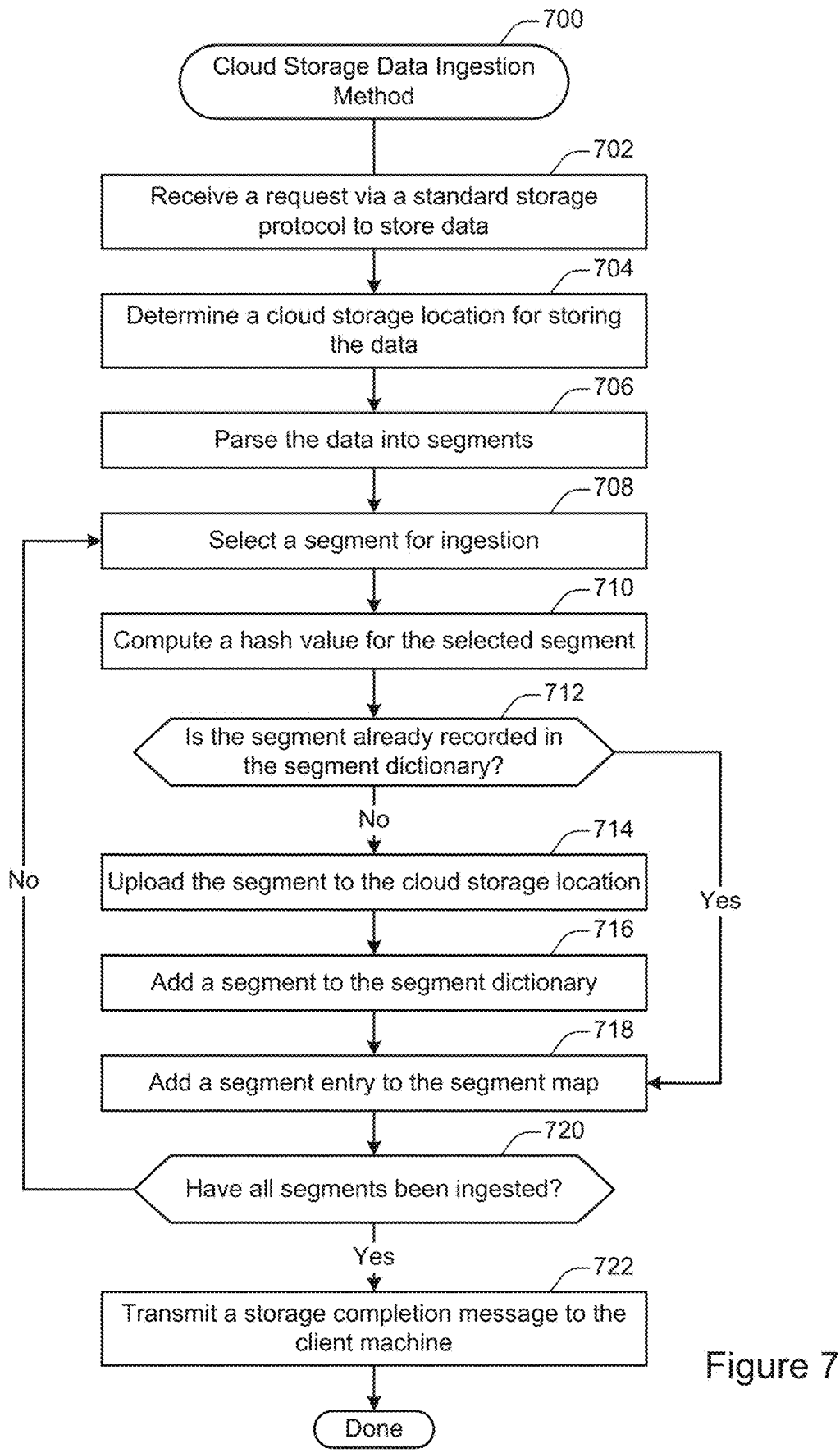
FIG. 7 illustrates an example of a method for cloud storage data ingestion, performed in accordance with one or more embodiments.

FIG. 7 illustrates an example of a cloud storage data ingestion method 700, performed in accordance with one or more embodiments. According to various embodiments, the method 700 may be performed at a client machine and gateway device in communication via the internet.

At 702, a request is received via a standard storage protocol to store data. According to various embodiments, the request may be received at a filesystem client. The filesystem client may reside at a gateway. Alternately, the filesystem client may reside at the client. For instance, the filesystem client may reside on the client machine itself or on a device located on a network local to the client machine.

At 704, a cloud storage location for storing the data is determined. According to various embodiments, any suitable cloud storage location may be used. For example, the client may be associated with configuration information that specifies that data should be stored to an Amazon S3 bucket.

The data is parsed into segments at 706. In some embodiments, the data may include one or more files. According to various embodiments, any suitable parsing technique may be used. For example, a file may be parsed into segments of fixed length. As another example, a file may be parsed into segments of variable length segments by applying a parsing algorithm that separates at consistent points, which may facilitate improved deduplication.

At 708, a segment is selected for ingestion. In some embodiments, segments may be ingested sequentially or in any other suitable serial order. Alternately, segments may be ingested in parallel. For example, different segments may be ingested by different gateways, which may improve throughout.

At 710, a hash value of the segment is computed. In some implementations, the hash value may be computed at a location local to the client device. Alternately, the hash value may be computed at the gateway at a location remote from the client device. The hash value may be computed using any suitable hashing technique, such as MD5 or SHA-1.

At 712, a determination is made as to whether the segment is already recorded in the segment dictionary. In some embodiments, the determination may be made by comparing the hash value of the segment to the hash value of segments stored within the dictionary.

If the segment is not already recorded within the segment dictionary, then at 714 the segment is uploaded to the cloud storage location. At 716, the segment is added to the segment dictionary. According to various embodiments, a segment need not be uploaded if it is already stored within the system.

At 718, a segment entry is added to the segment map. According to various embodiments, the segment map may include an entry for each segment and may indicate how segments are combined to form files.

At 720, a determination is made as to whether all segments have been ingested. If not, then the next segment is selected for ingestion at operation 708. If so, then at 722 a storage completion message is transmitted to the client machine.

Figure 8:
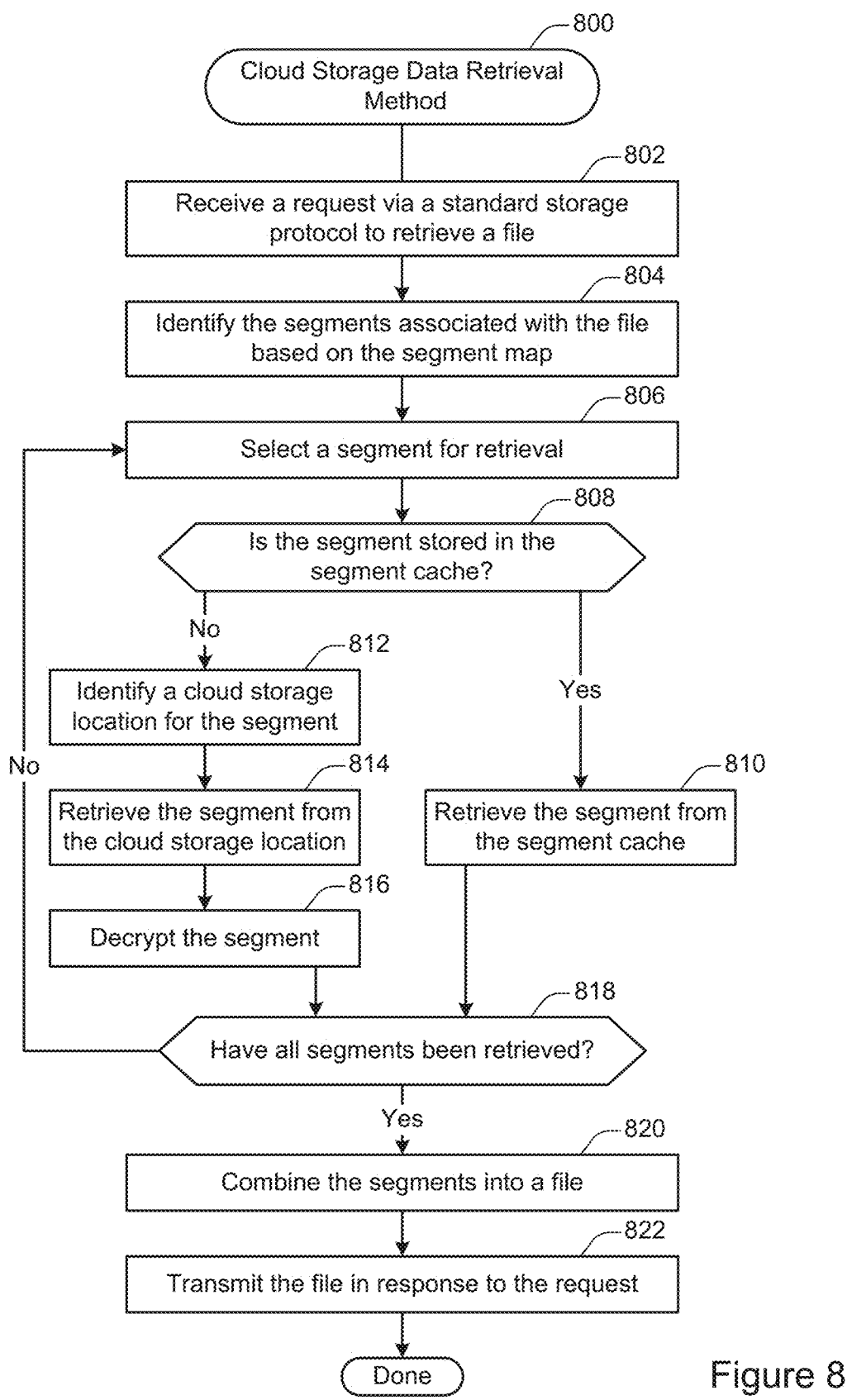
FIG. 8 illustrates an example of a method for cloud storage data retrieval, performed in accordance with one or more embodiments.

FIG. 8 illustrates an example of a cloud storage data retrieval method 800, performed in accordance with one or more embodiments. According to various embodiments, the method 800 may be performed at a client machine and gateway device in communication via the internet.

At 802, a request to retrieve a file is received via a standard storage protocol. According to various embodiments, the request may be received at a filesystem client. The filesystem client may reside at a gateway. Alternately, the filesystem client may reside at the client. For instance, the filesystem client may reside on the client machine itself or on a device located on a network local to the client machine.

At 804, the segments associated with the file are identified based on the segment map. In some embodiments, the segment map may include a list of the segments associated with each file, along with information such as a location at which a segment is stored.

At 806, a segment is selected for retrieval. In some embodiments, segments may be retrieved sequentially or in any other suitable serial order. Alternately, segments may be retrieved in parallel. For example, different segments may be retrieved by different gateways, which may improve throughout.

At 808, a determination is made as to whether the segment is stored in the segment cache. If the segment is stored in the segment cache, then it may be retrieved from the segment cache at operation 810. According to various embodiments, the segment cache may store segments recently accessed by the gateway.

If instead the segment is not stored in the segment cache, then it is retrieved from cloud storage at operations 812-816. At operation 812, a cloud storage location for the segment is identified. For example, the location may be identified from the segment map. At operation 814, the segment is retrieved from the identified cloud storage location. At 816, the retrieved segment is decrypted.

At 818, a determination is made as to whether all segments have been retrieved. If the segments have not all been retrieved, then the next segment may be selected for retrieval at operation 806.

If instead all segments have been retrieved, then the segments are combined into a file at 820. In some embodiments, the segment map may include information such as segment ordering data that indicates how the segments associated with a file may be combined to reconstruct the file. Once the file is reconstructed, at 822 the file is transmitted to the client in response to the request.

Figure 9:
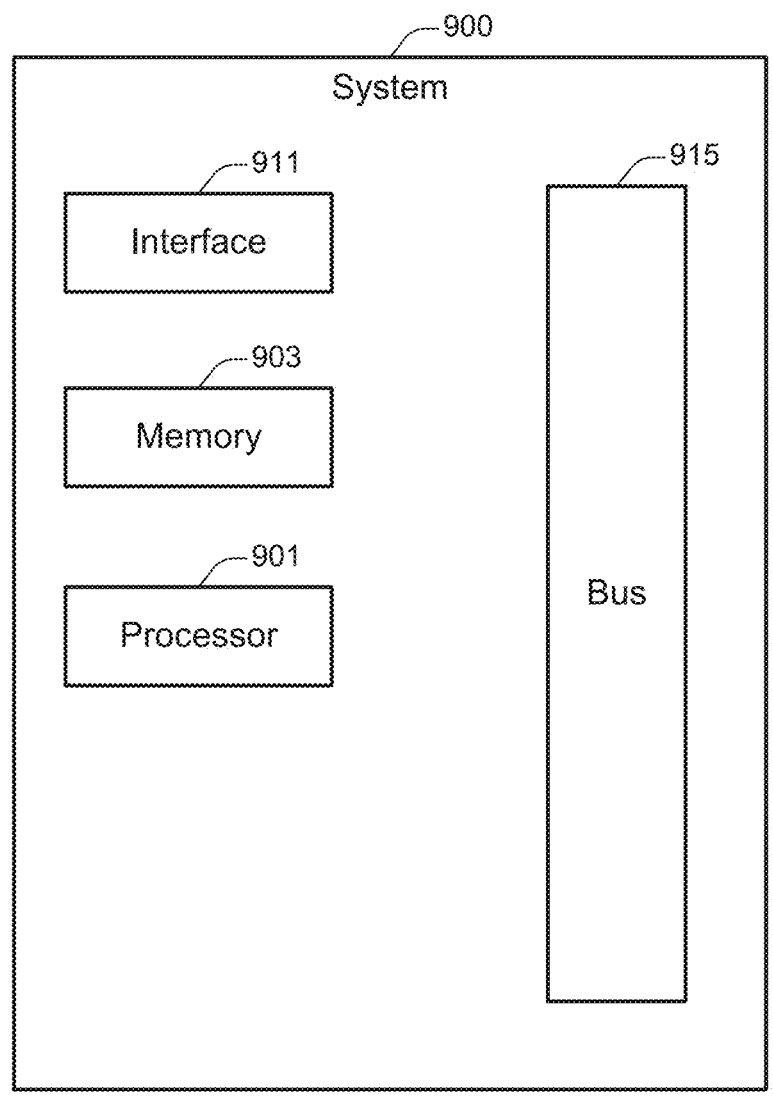
FIG. 9 illustrates an example of a server, configured in accordance with one or more embodiments.

FIG. 9 illustrates one example of a server. According to particular embodiments, a system 900 suitable for implementing particular embodiments of the present invention includes a processor 901, a memory 903, an interface 911, and a bus 919 (e.g., a PCI bus or other interconnection fabric). When acting under the control of appropriate software or firmware, the processor 901 is responsible for implementing applications such as a virtual machine, metadata system, or other such component of the system described herein. Various specially configured devices can also be used in place of a processor 901 or in addition to processor 901. The interface 911 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 900 is a virtual machine configured to communicate with one or more clients and one or more cloud storage systems. Although a particular server is described, it should be recognized that a variety of alternative configurations are possible. For example, the modules may be implemented on another device connected to the server.

According to various embodiments, one or more methods described herein may be implemented entirely or in part on the system 900. Alternately, or additionally, one or more methods described herein may be embodied entirely or in part as computer programming language instructions implemented on one or more non-transitory machine-readable media. Such media may include, but are not limited to: compact disks, spinning-platter hard drives, solid state drives, external disks, network attached storage systems, cloud storage systems, system memory, processor cache memory, or any other suitable non-transitory location or locations on which computer programming language instructions may be stored.

Figure 10:
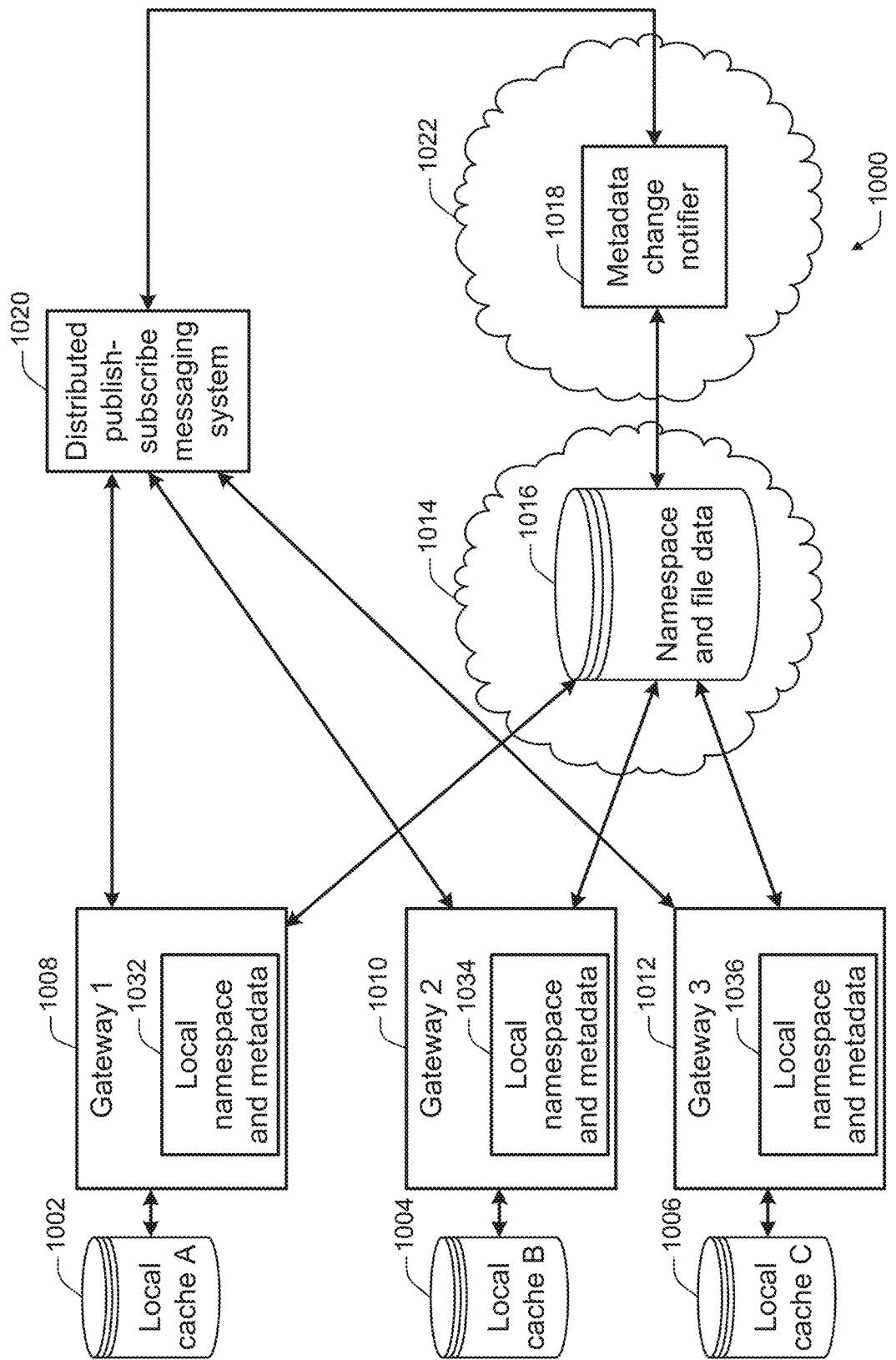
FIG. 10 illustrates an example of a system 1000 that facilitates cloud data storage, configured in accordance to one or more embodiments

FIG. 10 illustrates a system 1000 that facilitates cloud data storage, configured in accordance to one or more embodiments. According to various embodiments, the system 1000 may be used to ingest files or other data objects for storage in the cloud. The components shown in FIG. 10 may be used in conjunction with other techniques and mechanisms described herein to provide a cloud storage solution.

In some embodiments, the system 1000 may be used to transfer data that is stored on one or more local storage caches such as the caches 1002-1006. Each local storage cache may include all or a portion of recently ingested file contents. For example, the local storage cache A 1002 may include data ingested from one or more physical or virtual storage disks associated with an organization.

According to various embodiments, the system 1000 may include multiple gateways. Each gateway may be configured to read from and/or write to one or more local caches. Similarly, multiple gateways at the same or different physical locations may write to and/or read from the same cloud target. Also, a single gateway may write to and/or read from multiple cloud targets. Various configurations are possible.

According to various embodiments, each gateway may divide data objects into segments and store those segments in the cloud along with a map of segments for each data object. Redundancy may be achieved through cloud account settings for replication. For example, an organization may choose to replicate across different zones to reduce readback latencies.

In some implementations, each gateway may maintain a local namespace and metadata repository such as the repositories 1032, 1034, and 1036. The namespace and metadata repository may contain information such as the namespace for each of the ingested files. the local namespace and metadata stored in the repository may continue to grow to as large as the global vault requires to encompass the files ingested at the gateway. That is, the local namespace and metadata repository may serve as locally-complete information sources rather than caches.

According to various embodiments, namespace and file data may be stored in a data repository 1016. The data repository 1016 may be any suitable location or locations for storing data in the cloud. For example, the data repository 1016 may include one or more Amazon S3 buckets, Google Storage buckets, or Microsoft Azure Storage buckets. The data repository 1016 may include components from one or more of any suitable public or private cloud computing infrastructure.

According to various embodiments, the data repository 1016 may include global namespace information for the entire volume stored in a cloud computing platform 1014. In some embodiments, the data repository 1016 may serve as the master copy of the namespace data. In particular embodiments, the repository 1016 may rely on the cloud provider's replication for redundancy.

At 1018, a metadata change notifier is shown. In some embodiments, the metadata change notifier 1018 is a service running in a cloud computing platform 1022. The metadata change notifier 1018 listens to any changes to the namespace and/or the file metadata. The metadata change notifier 1018 will then push messages characterizing those changes to the distributed publish-subscribe messaging system 1020.

According to various embodiments, the cloud computing platform 1014 and the cloud 1022 may each include one or more internet-accessible components provided by a cloud computing service provider. In some configurations, the same cloud computing service provider may provide the services for supporting both the namespace and file data 1016 and the metadata change notifier 1018. Alternately, these services may be provided by different cloud computing service providers. That is, the cloud computing platforms 1014 and 1022 may be the same platform or different platforms.

At 1020, a distributed publish-subscribe messaging system is shown. A publish-subscribe system is a messaging pattern where senders of messages, called publishers, do not program the messages to be sent directly to specific receivers, called subscribers, but instead categorize published messages into classes, queues, or topics without knowledge of which subscribers, if any, there may be. Similarly, subscribers may express interest in one or more classes and only receive messages that are of interest, without knowledge of which publishers, if any, there are. An example of a distributed publish-subscribe messaging system is Kafka.

According to various embodiments, the distributed publish-subscribe messaging system 1020 may be used by gateways to identify namespace/data changes and update the local namespace and metadata. In addition, the publish-subscribe messaging system 1020 may apply any data changes to the local cache. For example, individual gateways may subscribe to updates that relate to particular data objects or local caches so that the gateways receive information relevant to their operations.

According to various embodiments, a file may be segmented into multiple objects and uploaded in parallel, and multiple files may be uploaded from multiple gateways. Such an approach may provide for higher ingestion and backup throughput by eliminating or reducing cloud object throughput limitations, local disk reads, and network bandwidth constraints.

According to various embodiments, multiple files and/or segments can be read in parallel from multiple gateways to achieve desired read and/or restore throughput when retrieving data from the cloud. Such an approach avoids high physical cluster costs and relies instead on cloud native replication for redundancy and availability.

Figure 11:
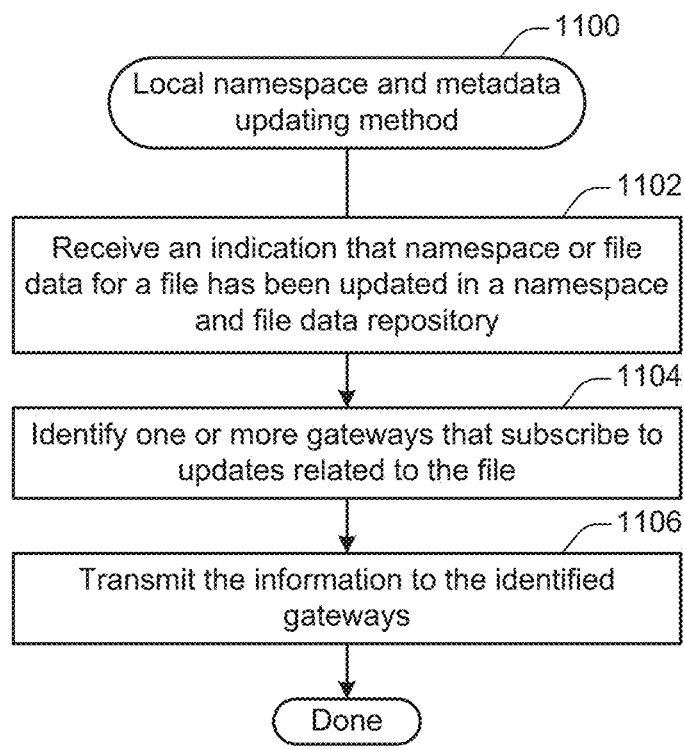
FIG. 11 illustrates an example of a local namespace and metadata updating method 1100, performed in accordance with one or more embodiments.

FIG. 11 illustrates an example of a local namespace and metadata updating method 1100, performed in accordance with one or more embodiments. In some implementations, the method 1100 may be performed at a distributed publish-subscribe messaging system such as the system 1020 shown in FIG. 10.

At 1102, an indication is received that namespace or file data for a file has been updated in a namespace and file data repository. According to various embodiments, the metadata change notifier 1018 may monitor the namespace and file data repository 1016 for changes. When such changes occur, the metadata change notifier 1018 may publish a message characterizing the changes to the distributed publish subscribe messaging system 1020.

At 1104, one or more gateways that subscribe to updates related to the file are identified. According to various embodiments, each gateway may notify the messaging system 1020 of files relevant to the gateway. For example, each gateway may notify the system of files to which to subscribe when ingesting files. For instance, each gateway may subscribe to updates related to files ingested by the gateway.

At 1106, the information is transmitted to the identified gateways. In some embodiments, the information may be used to update the local namespace and metadata stored on the gateway. The information may include the names, sizes, and other characteristics of files stored in the namespace and file data repository 1016.

The invention claimed is:

1. A system comprising:
a plurality of gateways each configured to receive data from a client machine and store the data in a file data repository accessible via the internet, each of the gateways including a respective local namespace and metadata repository characterizing the data;
a central namespace and file data repository storing data received from the plurality of gateways, the stored data sharing a common master namespace; and
a messaging system configured to receive an indication of updated central namespace data and metadata from the central namespace and file data repository and transmit the central namespace data and metadata to the plurality of gateways, wherein the messaging system is further configured to identify a first one of the plurality of gateways that subscribe to updates related to the namespace data and metadata repository and identify a second one of the plurality of gateways that subscribe to updates related to the namespace data and metadata, the updated central namespace data and metadata being transmitted to the identified gateways, wherein the first gateway is configured to update a first local namespace and metadata repository associated with the first gateway based on the updated central namespace data and metadata and wherein the second gateway is configured to update a second local namespace and metadata repository associated with the second gateway based on updated central namespace data and metadata.

2. The system of claim 1, wherein a first one of the gateways is configured to receive a request to add a file to the central namespace and file data repository, and responsive to receiving the request to add the file to the central namespace and file data repository, updating the common master namespace according based on the file added to the central namespace and file data repository.

3. The system of claim 2, wherein the file is parsed into a plurality of file segments and a first one of the file segments is provided to the file data repository storing data using a segment map, the segment map including a segment identifier and a corresponding hash value.

4. The system of claim 1, the system further comprising a metadata change system configured to communicate with to the messaging system, the metadata change system configured to provide indications of updates associated with the common master namespace.

5. The system of claim 1, wherein a first one of the gateways is configured to:
   determine that a first local namespace is different from the common master namespace; and
   responsive to determining that the first local namespace is different from the common master namespace, requesting updated namespace data.

6. A method comprising:
   receiving, by a plurality of gateways, data from a client machine and storing the data in a file data repository accessible via the internet, each of the gateways including a respective local namespace and metadata repository characterizing the data;
   receiving, by a central namespace and file data repository, data from the plurality of gateways, the stored data sharing a common master namespace;
   receiving, by a messaging system an indication of updated central namespace data and metadata from the central namespace and file data repository;
   transmitting the updated central namespace data and metadata to the plurality of gateways;
   identifying a first one of the plurality of gateways that subscribe to updates related to the namespace data and metadata repository and identifying a second one of the plurality of gateways that subscribe to updates related to the namespace data and metadata, the namespace data and metadata being transmitted to the identified gateways; and
   updating a first local namespace and metadata repository associated with the first gateway based on the updated central namespace data and metadata and updating a second local namespace and metadata repository associated with the second gateway based on the updated central namespace data and metadata.

7. The method of claim 6, the method further comprising receiving a request to add a file to the central namespace and file data repository and responsive to receiving the request to add the file to the central namespace and file data repository, updating the common master namespace according based on the file added to the central namespace and file data repository.

8. The method of claim 7, wherein the file is parsed into a plurality of file segments and a first one of the file segments is provided to the file data repository storing data using a segment map, the segment map including a segment identifier and a corresponding hash value.

9. The method of claim 6, the method further comprising a metadata change system configured to communicate with to the messaging system, the metadata change system configured to provide indications of updates associated with the common master namespace.

10. The method of claim 6, wherein a first one of the gateways determines that a first local namespace is different from the common master namespace and responsive to determining that the first local namespace is different from the common master namespace, requesting updated namespace data.

11. A computer program product comprising one or more non-transitory computer readable media having instructions stored thereon for performing a method, the method comprising:
   receiving, by a plurality of gateways, data from a client machine and storing the data in a file data repository accessible via the internet, each of the gateways including a respective local namespace and metadata repository characterizing the data;
   receiving, by a central namespace and file data repository, data from the plurality of gateways, the stored data sharing a common master namespace;
   receiving, by a messaging system an indication of updated central namespace data and metadata from the central namespace and file data repository;
   transmitting the updated central namespace data and metadata to the plurality of gateways;
   identifying a first one of the plurality of gateways that subscribe to updates related to the namespace data and metadata repository and identifying a second one of the plurality of gateways that subscribe to updates related to the namespace data and metadata, the namespace data and metadata being transmitted to the identified gateways; and
   updating a first local namespace and metadata repository associated with the first gateway based on the updated namespace data and metadata and updating a second local namespace and metadata repository associated with the second gateway based on updated namespace data and metadata.

12. The computer program product of claim 11, the method further comprising receiving a request to add a file to the central namespace and file data repository and responsive to receiving the request to add the file to the central namespace and file data repository, updating the common master namespace according based on the file added to the central namespace and file data repository.

13. The computer program product of claim 12, wherein the file is parsed into a plurality of file segments and a first one of the file segments is provided to the file data repository storing data using a segment map, the segment map including a segment identifier and a corresponding hash value.

14. The computer program product of claim 11, the method further comprising a metadata change system configured to communicate with to the messaging system, the metadata change system configured to provide indications of updates associated with the common master namespace.

* * * * *